April 21, 1925.
G. N. LYON
SAW SUPPORT AND GUIDE
Filed Aug. 11, 1923
1,534,405
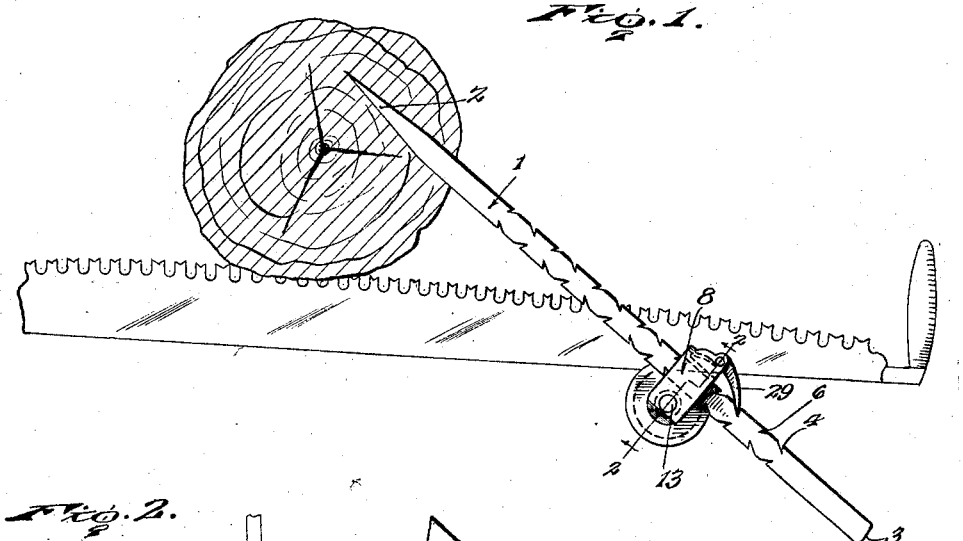
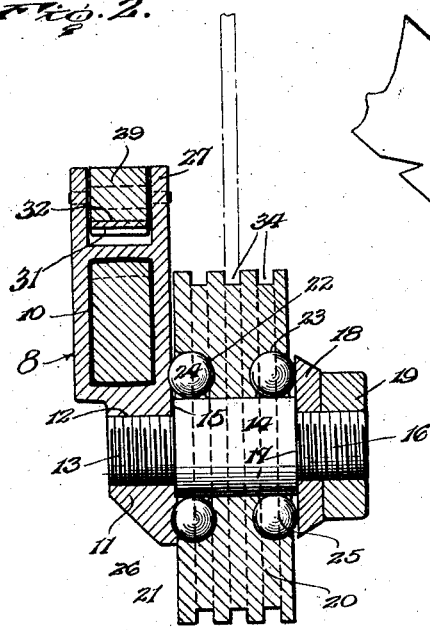
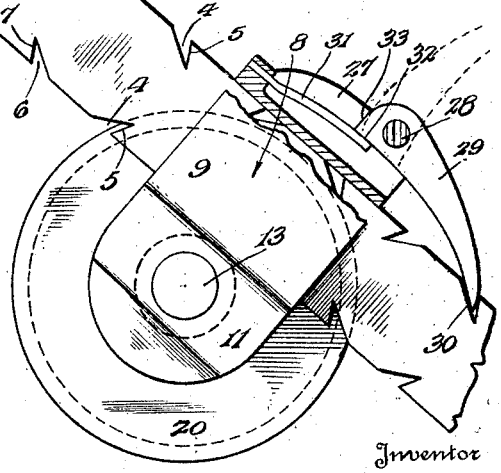
Inventor
G. N. Lyon.
By Lacey & Lacey, Attorneys Patented Apr. 21, 1925.

1,534,405

UNITED STATES PATENT OFFICE.

GEORGE N. LYON, OF POWERS, OREGON, ASSIGNOR OF ONE-HALF TO WILLIAM B. SULLIVAN, OF POWERS, OREGON.

SAW SUPPORT AND GUIDE.

Application filed August 11, 1923. Serial No. 656,856.

*To all whom it may concern:*

Be it known that I, GEORGE N. LYON, a citizen of the United States, residing at Powers, in the county of Coos and State of Oregon, have invented certain new and useful Improvements in Saw Supports and Guides, of which the following is a specification.

This invention relates to supports and guides for cross cut saws of the type known as undercutters.

In cases where a fallen log is supported solely at its end by other logs, inequalities in the ground surface or the like, it is impossible to saw the log in two at its intermediate portion for the reason that the walls of the cut made in the saw would so tightly bind the saw blade as to inhibit movement of the blade, this being caused through sagging of the log at its unsupported intermediate portion. It therefore becomes necessary, under such conditions, to saw the log in two from the under side and in order to support the cross cut saw during this operation, various devices have been heretofore employed but they have all presented disadvantages rendering their use either impracticable or unsatisfactory. Therefore, it is one of the objects of the present invention to provide a support for a cross cut saw upon which the back of the blade of the saw may be rested and by which the blade will be guided in the sawing operation, the said support or undercutter being designed to be fixed with relation to the log to be cut in such manner that the blade will be supported for reciprocation beneath the log.

Another object of the invention is to so construct the device that it will provide for extreme freedom of movement of the saw although at the same time effectually supporting the saw and guiding it in its reciprocatory movement.

Another object of the invention is to provide a saw support of the class mentioned which will be substantial in construction, inexpensive to manufacture, and very durable, whereby even under rough usage to which the support will be subjected, there will be no likelihood of disarrangement of the parts comprising the support and minimum strain imposed upon the said parts.

Under the conditions above referred to, that is to say, where the log to be cut is supported at its end but has no support at its intermediate portion, there may be another difficulty to be overcome, that is to say it may be found impossible to so position the support that the sustaining bar thereof, which is to be driven into the log as will be presently explained, will extend in a downward direction from the log to support the supporting and guiding member of the device, and therefore the present invention has as a further important object to so construct the parts that the sustaining bar may be driven downwardly into a log to be cut and the device still employed in a satisfactory manner.

As indicated above, the support embodying the invention comprises a sustaining bar, and a support proper which is mounted upon the bar, and means is provided for holding the support in various positions of adjustment longitudinally of the bar, and in this connection the invention further contemplates the provision of means whereby the support proper may be readily slipped from the bar at the time the bar is to be driven into the log so that, being clear of the bar, it will not be subjected to any shocks which would be transmitted to it if it were present upon the bar.

In the accompanying drawings:

Figure 1 is a side elevation of the undercutter or saw support embodying the invention, the same being mounted upon a log to be cut and the log being illustrated in section;

Figure 2 is a detail transverse sectional view on the line 2—2 of Figure 1 looking in the direction indicated by the arrows, the saw blade being shown in dot and dash lines;

Figure 3 is a detail side elevation of a portion of the undercutter, a part being broken away to better illustrate the construction.

In the drawings, the sustaining bar of the undercutter or support is indicated by the numeral 1 and this bar is provided with a tapered or pointed entering end indicated by the numeral 2, the other end of the bar being left blunt as indicated by the numeral 3 so that blows may be struck thereon for the purpose of driving the entering end of the bar into the log to be cut in the manner shown in Figure 1 of the drawings. At this point it may be stated that ordinarily the bar would be driven into the log in substantially the inclined position shown in the said figure, but under some conditions which will be encountered, it may become necessary to drive the bar into the log in a more or less downward direction. In any event, when the bar has been driven into the log, it will be securely anchored in place and will constitute a firm support for the support proper which is mounted thereon and will presently be described. The bar 1 is preferably flat sided and has its upper and lower edges transversely rounded as illustrated in Figure 2 of the drawings, and for a purpose which will be hereinafter pointed out, the bar is formed in each edge with a longitudinally extending series of notches 4 having abruptly inclined walls 5 located next adjacent the butt end of the bar. Each edge of the bar is likewise formed with a longitudinal series of notches 6 preferably alternating with the notches 4 and having abruptly inclined walls 7 located next adjacent the entering end 2 of the bar.

The support proper, heretofore referred to, comprises a follower indicated in general by the numeral 8, and the said follower comprises a body member 9 which is formed with an opening 10 extending therethrough and of a contour and dimensions to slidably receive the sustaining bar 1. At its under side, the body member 9 is provided with a downward extension or boss indicated by the numeral 11, and this boss is formed with a threaded socket 12 into which is fitted the threaded reduced end 13 of a stub shaft 14. The shoulder formed by reducing and threading the end of the shaft, and indicated by the numeral 15, abuts squarely against the side face of the boss 11 as clearly shown in Figure 2 of the drawings, and the shaft is in this manner mounted in a most substantial way upon the follower 8. The opposite end of the shaft is likewise reduced and threaded as indicated by the numeral 16, and fitted onto this end of the shaft and resting at one face against the shoulder 17 formed by reducing the shaft at this end, is a bearing disc 18 held in place against the shoulder by a nut 19 threaded onto the portion 16 of the shaft. The numeral 20 indicates a saw blade supporting roller which is formed axially with a bore 21 receiving the intermediate portion of the shaft 14, and at the opposite end of the bore, the roller is formed in its side faces with ball races 22 and 23, bearing balls 24 and 25 being arranged in the races 22 and 23, respectively. The races are so formed that the bearing balls 24 and 25 will contact the circumferential surface of the intermediate portion of the shaft 14, and will likewise project slightly beyond the plane of the opposite side faces of the roller. The face of the body 9 of the follower 8 which is located next adjacent the roller 20 is formed with a shallow ball race 26 in which the bearing balls 24 may travel, and in a similar manner the balls 25 travel against the inwardly presented face of the bearing disc 18. In this manner the roller 20 is supported for free rotation and there is no likelihood of its binding against any proximate part of the structure. In order that the follower 8 may be held at various positions of adjustment longitudinally of the bar 1, the body member 9 is formed at its upper side with spaced cheek pieces 27 between which is pivoted, as at 28, a pawl 29, the engaging end 30 of which pawl is designed to enter the notches 4 or 6 as the case may be. A leaf spring 31 is secured at one end in or to the upper side of the body member 9 and extends between the cheek pieces 27 and engages at its free end against a flat surface or shoulder 32 formed upon the butt end of the pawl 29 forwardly of the pivot 28, the spring being so arranged as to exert pressure in an outward direction against the shoulder and thereby hold the toothed end of the pawl in engagement with the upper edge of the sustaining bar 1. The said butt end of the pawl is likewise formed with a shoulder 33 which occupies a plane at right angles to the shoulder 32 and is extended in a forward direction and by reference to Figure 3 of the drawings, it will be observed that the pawl 29 may be swung from the full line or active position illustrated in said figure to the dotted line or inactive position and held in either of the two positions, the spring in the first instance engaging against the shoulder 32, and in the latter instance against the shoulder 33. By so forming the butt end of the pawl and arranging the spring for coaction with the shoulders 32 and 33 selectively, the pawl may be swung up to the dotted line position and so held while the support proper is being slid onto or off from the sustaining bar.

In order that the saw blade may be guided in its backward and forward motion during the sawing operation, the roller 20 is provided with one or more circumferential grooves 34, and these grooves may if desired be of different widths so as to accommodate saw blades of different thicknesses, or they may all be of the same width.

In using the device, the pawl 29 is swung upwardly upon the pivot 28 from the full line position to the dotted line position shown in Figure 3, and the supporting device proper is slid off from the sustaining bar 1. The bar is then driven into the log, preferably in the position shown in Fig. 1 of the drawings, in which position it will be inclined downwardly from the log. The supporting device proper is then slid onto the bar at the butt end thereof and the pawl 29 is swung down to assume the full line position above referred to. The said member 8 is then adjusted along the bar until it will assume such a position that when the back of the saw blade is disposed upon the roller 20, the toothed edge of the saw blade will extend beneath and close to the under side of the log. The blade may then be moved backwardly and forwardly in the usual manner, traveling over the periphery of the roller 20 and the blade may be tilted so as to cut into the log. As the blades cut into the log, the member 8 is from time to time shifted upwardly along the bar 1 as the cut becomes deeper. Should it be found impracticable to drive the bar 1 into the log in the position shown in Figure 1 and should it therefore become necessary to drive the same into the log in a more or less downward direction, the member 8 will be slid from the bar 1, reversed end for end, and again slid onto the bar. In the first described manner of using the device, the pawl 29 will engage in the notches 4 and in the latter instance just referred to, the said pawl will, in its reversed position, engage in the notches 6.

Having thus described the invention, what is claimed as new is:

In a device of the class described, a bar having an end to be driven into a log to be sawed, a member slidable along the said bar and removable therefrom and reversible end for end, the bar having a series of notches in one longitudinal edge presented in one direction, and another series of notches presented in the opposite direction, a pawl upon the said member engageable with the notches of one series when the member is applied to the bar in one position, the pawl being engageable with notches of the other series when the said member is applied in an endwise reversed position, and means upon the said member for supporting a saw blade for reciprocation.

In testimony whereof I affix my signature.

GEORGE N. LYON. [L. S.]